(12) United States Patent
Hong

(10) Patent No.: US 6,223,245 B1
(45) Date of Patent: Apr. 24, 2001

(54) DEVICE AND METHOD FOR GENERATING INTERRUPT

(75) Inventor: Sang Pyo Hong, Chungcheongbuk-do (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 08/931,754

(22) Filed: Sep. 16, 1997

(30) Foreign Application Priority Data

Jan. 16, 1997 (KR) .................................................. 97-1154

(51) Int. Cl.[7] ...................................................... G06F 11/00
(52) U.S. Cl. ............................................ 710/260; 714/704
(58) Field of Search ...................... 714/704; 710/260–269

(56) References Cited

U.S. PATENT DOCUMENTS

| | | | |
|---|---|---|---|
| 4,961,067 | | 10/1990 | Suzuki . |
| 4,962,470 | * | 10/1990 | Hansen ................................. 702/151 |
| 5,461,345 | * | 10/1995 | Taki ......................................... 331/1 |
| 5,633,742 | * | 5/1997 | Shipley ................................ 359/137 |
| 5,727,216 | * | 3/1998 | Takasu et al. ....................... 710/260 |
| 5,812,429 | * | 9/1998 | Downey et al. ..................... 702/190 |
| 5,822,726 | * | 10/1998 | Taylor et al. ........................ 707/233 |

\* cited by examiner

*Primary Examiner*—David A. Wiley

(57) ABSTRACT

A device and method for generating non-false interrupt signals are disclosed. They discriminate between noise and real signals from the interrupt sources. The device includes: plural signal generators for supplying indiscriminate interrupt demanding signals in response to signals from plural interrupt sources, respectively; plural counters for counting the indiscriminate interrupt demanding signals from the signal generators, respectively, to produce count values; plural comparators for comparing reference values against the counts to produce authenticated interrupt demanding signals, respectively; and a priority determining unit for receiving the authenticated interrupt demanding signals, for determining the relative priorities of these signals, and for issuing interrupt signals according to the priorities.

12 Claims, 3 Drawing Sheets

DEVICE AND METHOD FOR GENERATING INTERRUPT

FIELD OF THE INVENTION

The present invention relates to a device for generating an interrupt and, more particularly, to noise-insensitive device and method for generating an interrupt, which is suitable for efficient execution of a plurality of interrupts according to their priorities.

BACKGROUND OF THE INVENTION

In general, a microcomputer employs a microprocessor as a CPU for processing data and controlling the microcomputer, an input/output device for input/output of data, and a memory for storing programs and data. Thus, a single chip microcomputer, or microcomputer unit (MCU), is a computer in which the microcomputer is integrated onto a single chip.

A conventional device for generating an interrupt will be explained with reference to the attached drawings. FIG. 1 illustrates a block diagram of the conventional device for generating an interrupt.

Referring to FIG. 1, the conventional device for generating an interrupt includes: a plurality of interrupt enabling parts 1 (e.g., each represented by a bit of a register, respectively); a plurality of interrupt demanding signal generating parts 2; an interrupt priority determining part 3 (including a register having one bit for each generating part 2); a bus 4; and an MCU 5. Interrupt sources include such things as a timer, a keyboard controller, a clock, a mouse, a math coprocessor, a disk drive and a communication part.

An interrupt enabling part 1 acts as a switch by which a corresponding interrupt demanding signal generator part can be turned ON/OFF by the MCU 5. For example, the enabling part 1 controllably blocks/passes the signal generated by the generating part 2. Each of the interrupt enabling parts 1 enables operation of the corresponding generating part 2 according to whether a bit is set or not in the enabling part 1 by the MCU 5.

Each of the interrupt demanding signal generating parts 2 (if enabled by the corresponding enabling part 1), upon reception of a signal from an interrupt source, generates an interrupt demanding signal and applies it to the MCU, and sets interrupt generating information bits corresponding to the interrupt source. When an interrupt demand, which is an interrupt demanding signal applied from a certain peripheral device to the CPU (i.e., the MCU) is generated, the MCU determines (by way of the interrupt priority determining part 3) whether the interrupt demand should be processed according to an interrupt priority or neglected. If an interrupt has been permitted, an interrupt response(or permission signal) is given to the peripheral device, according to which the peripheral device issues an interrupt signal. The interrupt priority determining part 3 receives a plurality of signals from the interrupt demanding signal parts 2 for use in determining priorities of the interrupt signals. That is, when the MCU has set a particular interrupt enabling part 1 according to a program, the correspondingly-enabled interrupt demanding signal generating part 2 applies its interrupt demanding signal to the interrupt priority determining part 3, thereby an interrupt of high priority is recognized and selected.

The operation of the conventional device for generating an interrupt having the aforementioned system will be explained.

Referring to FIG. 1, upon reception of signals from a plurality of interrupt sources, each of the interrupt demanding signal generating parts 2, if enabled, sets its corresponding bit in the register of the priority determining part 3, thereby ultimately causing an interrupt demanding signal to be sent to the MCU. Upon reception of a plurality of interrupt signals from the interrupt demanding signal generating parts 2, i.e., having the corresponding bits set in its register, the interrupt priority determining part 3 generates a final interrupt signal to the MCU corresponding to the relatively highest priority interrupt source after having organized the bits set in its register, i.e., the interrupt demanding signals that the priority determining part 3 has received, according to a predetermined hierarchy.

However, the generating parts 2 cannot discriminate between noise on the line and a real signal from the interrupt source. Where a bit set by noise has a higher priority than a bit set by a real interrupt, the priority determining part will select the noise over the real signal. Consequently, the conventional device for generating an interrupt cannot avoid issuing a false interrupt corresponding to noise, because the device cannot discriminate noise from real interrupt signals.

SUMMARY OF THE INVENTION

Accordingly, the present invention is directed to device and method for generating an interrupt that substantially obviates one or more of the problems due to limitations and disadvantages of the related art.

An object of the present invention is to provide a device and method for generating non-false interrupt demanding signals in order to permit the generation of non-false interrupts.

To achieve these and other advantages in accordance with the purpose of the present invention, as embodied and broadly described, in a microcomputer there is provided a device for discriminating between noise and real signals from interrupt sources so as to generate non-false interrupts. The device comprises: a plurality of signal generators for supplying indiscriminate interrupt demanding signals in response to signals from a plurality of interrupt sources, respectively; a plurality of counters for counting said indiscriminate interrupt demanding signals from the signal generators, respectively, to produce count values; a plurality of comparators for comparing reference values against said count values to produce authenticated interrupt demanding signals, respectively; and a priority determining unit for receiving said authenticated interrupt demanding signals, for determining priorities thereof, and for issuing interrupt signals according to said priorities.

In other aspects of the present invention, for a microcomputer to which interrupt sources are connected, there is provided a method for discriminating between noise and real signals from said interrupt sources so as to generate non-false interrupts, the method comprising the steps of: generating interrupt demanding signals in response to signals from said interrupt sources; counting said indiscriminate interrupting demanding signals for each interrupt source, respectively, to produce count values; comparing reference values against said count values, respectively, to discriminate between noise and real interrupt demanding signals and so produce authenticated interrupt demanding signals; determining priorities of said authenticated interrupt demanding signals; and issuing interrupt signals according to said priorities.

The foregoing and other objectives of the present invention will become more apparent from the detailed description given hereinafter. It should be understood, however, that the detailed description and specific examples, while indicating preferred embodiments, are given by way of illustration only, because various changes and modifications within the spirit and scope of the invention will become apparent to those skilled in the art from this detailed description and specific examples.

BRIEF DESCRIPTION OF THE DRAWINGS

The accompanying drawings, which are included to provide a further understanding of the invention and are incorporated in and constitute a part of this specification, illustrate exemplary embodiments of the invention and together with the description serve to explain the principles of, but do not limit, the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
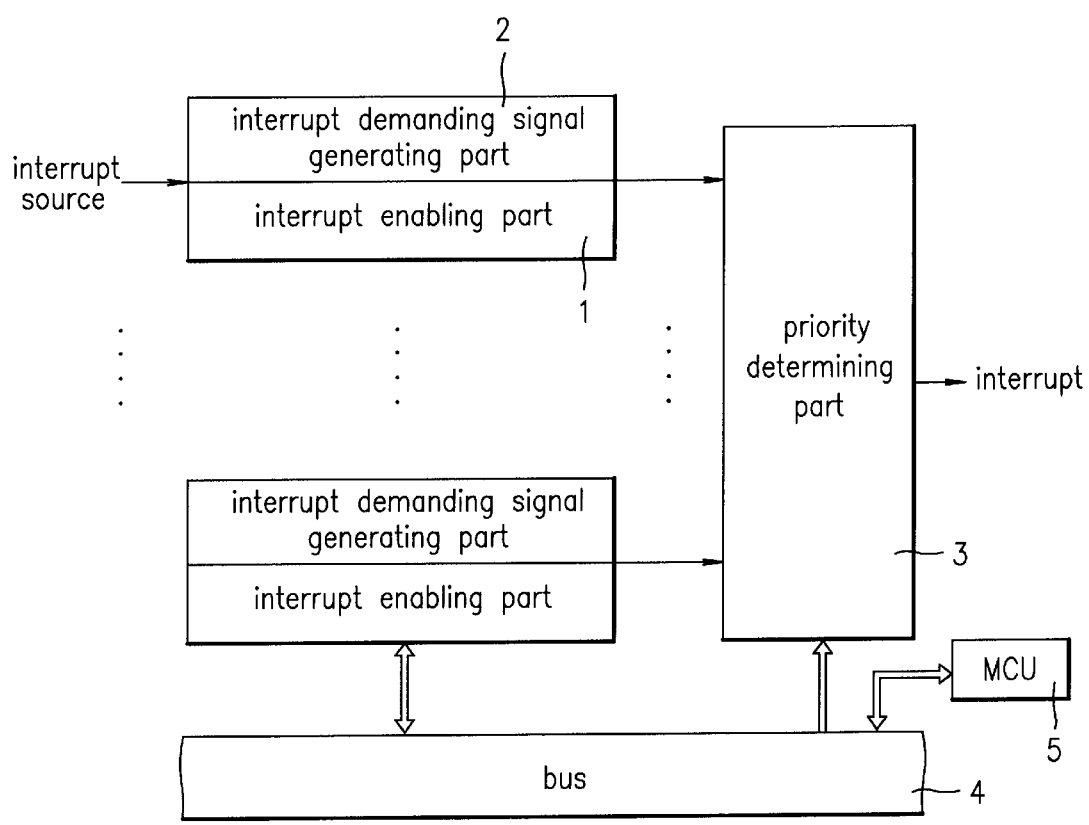
FIG. 1 illustrates a block diagram of a conventional device for generating an interrupt.
Figure 2:
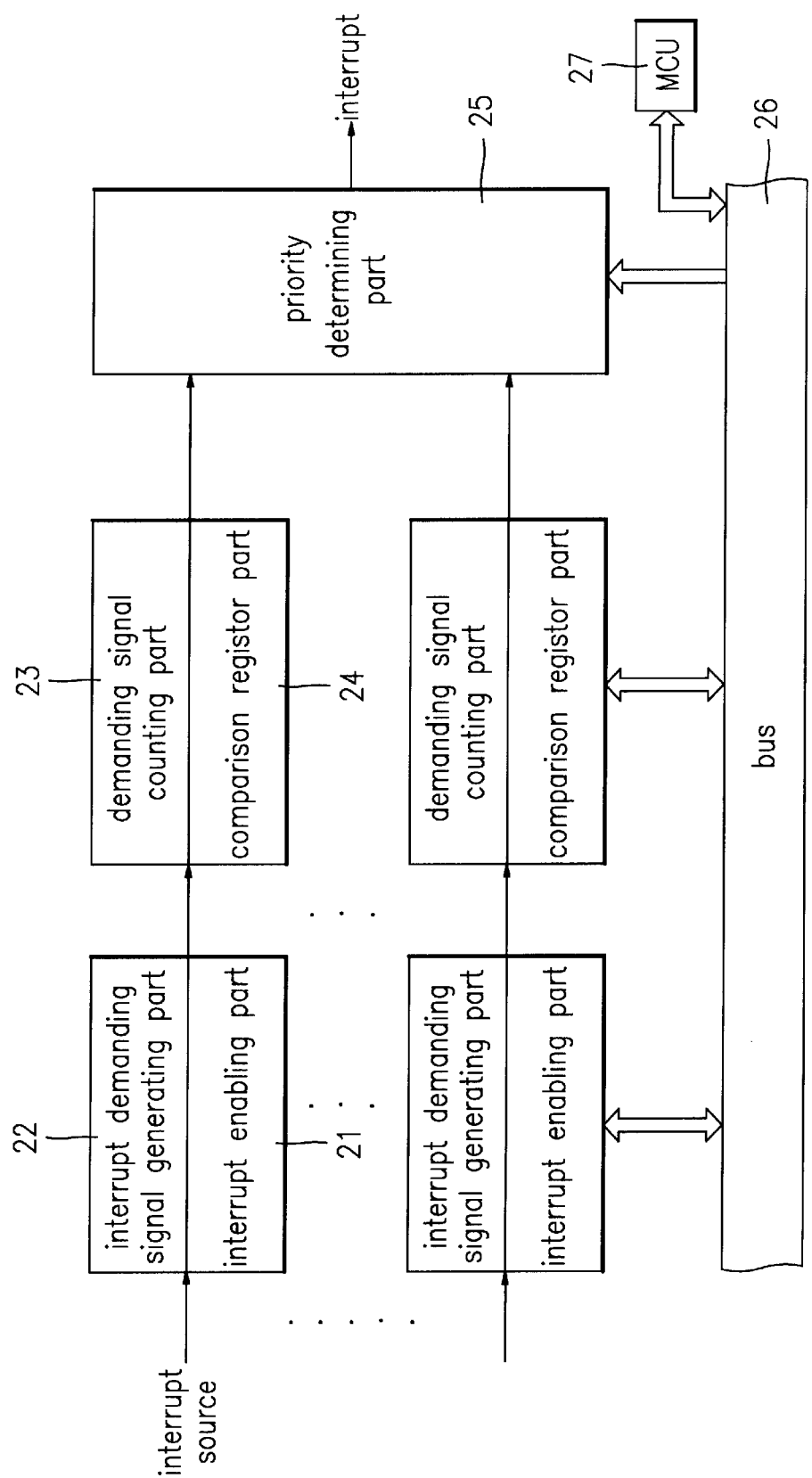
FIG. 2 illustrates a block diagram of a device for generating an interrupt in accordance with a preferred embodiment of the present invention; and, FIG. 3 illustrates a flow chart explaining a method for generating an interrupt in accordance with a preferred embodiment of the present invention.

FIG. 2 illustrates a block diagram of a device for generating an interrupt in accordance with a preferred embodiment of the present invention.

Referring to FIG. 2, the device for generating an interrupt in accordance with a preferred embodiment of the present invention includes: a plurality of interrupt enabling parts 21; a plurality of interrupt demanding signal generating parts 22; a plurality of demanding signal counting parts 23; a plurality of comparison register parts 24; an interrupt priority determining part 25; a bus 26; and a MCU 27. Each comparison register part 24 has a register (not shown) for handling a reference value, stored therein by the MCU, and a comparator (not shown). The comparator compares the value counted by the counting part 23 against the reference value in the register of the comparison register part 24.

The components 21–22 and 25–27 are similar to the corresponding conventional components 1–5, respectively. Each of the plurality of interrupt demanding signal generating parts 22 generates an interrupt demanding signal upon reception of a signal from an interrupt source. Each of the interrupt enabling parts 21 determines whether a signal generated in the interrupt demanding signal generating part 22 will be transferred to the demanding signal counting part 23. Each of the demanding signal counting parts 23 counts the interrupt demanding signal from the interrupt demanding signal generating part 22. The comparison register part 24 compares a value set by the MCU with a value counted by the demand signal counting part 23, and applies (as the result of the comparison) an interrupt demand generating signal to the interrupt priority determining part 25 if the value counted by the demanding signal counting part 23 and the value set in the MCU are identical. Then, the interrupt priority determining part 25, determines priorities among the interrupt demand generating signals, e.g., according to the program in the MCU, and then issues an interrupt to the demand signal of the relatively highest priority.

The operation of the device for generating an interrupt in accordance with a preferred embodiment of the present invention will be explained.

Referring to FIG. 2, if the interrupt sources generate signals, the corresponding interrupt demanding signal generating parts 22 generate interrupt demanding signals. The demand signals of the generating parts 22 are transferred to the counting parts 23 only if the corresponding enabling parts are set to enable by the MCU. Once the corresponding interrupt enabling parts 21 are set, the interrupt demanding signals are applied to corresponding demanding signal counting parts 23. As in the conventional art, the generating parts 22 cannot discriminate between noise and a real signal from the interrupt source.

The present invention is a recognition that a real signal from the interrupt source will continue, while noise most probably will not because it is like a random signal. By checking if the interrupt signal from the source repeats a predetermined number of times, a real signal can be discriminated from noise. The reference value (for the comparison) is chosen based upon the susceptibility of the interrupt source to noise, i.e., the higher the susceptibility, the higher the reference value.

A circumstance could occur where an interrupt source does not generate a real signal for a long time. During that long silence, there could occur a plurality of noise signals. The counter is controlled to reset at regular intervals to avoid a long period of silence during which enough noise signals could accrue so as to equal the reference value and be treated as a real interrupt situation. The counter time-out interval is sufficiently long enough so that the interrupt source, in a real interrupt situation, will generate more than enough signals to equal the reference value before the counter times-out and resets.

The demanding signal counting parts 23 count the interrupt demanding signals (to produce count values) and the comparison register parts 24 compare the reference values (preset in the program of the MCU) against the count values, respectively. If the demanding signal count values and the set values by the program are identical respectively, the comparison register part issues an authenticated interrupt demanding signal interrupt demanding signal to the interrupt priority determining part 25. Accordingly, the interrupt priority determining part 25, after determining priorities, issues an interrupt signal of the highest priority.

Figure 3:
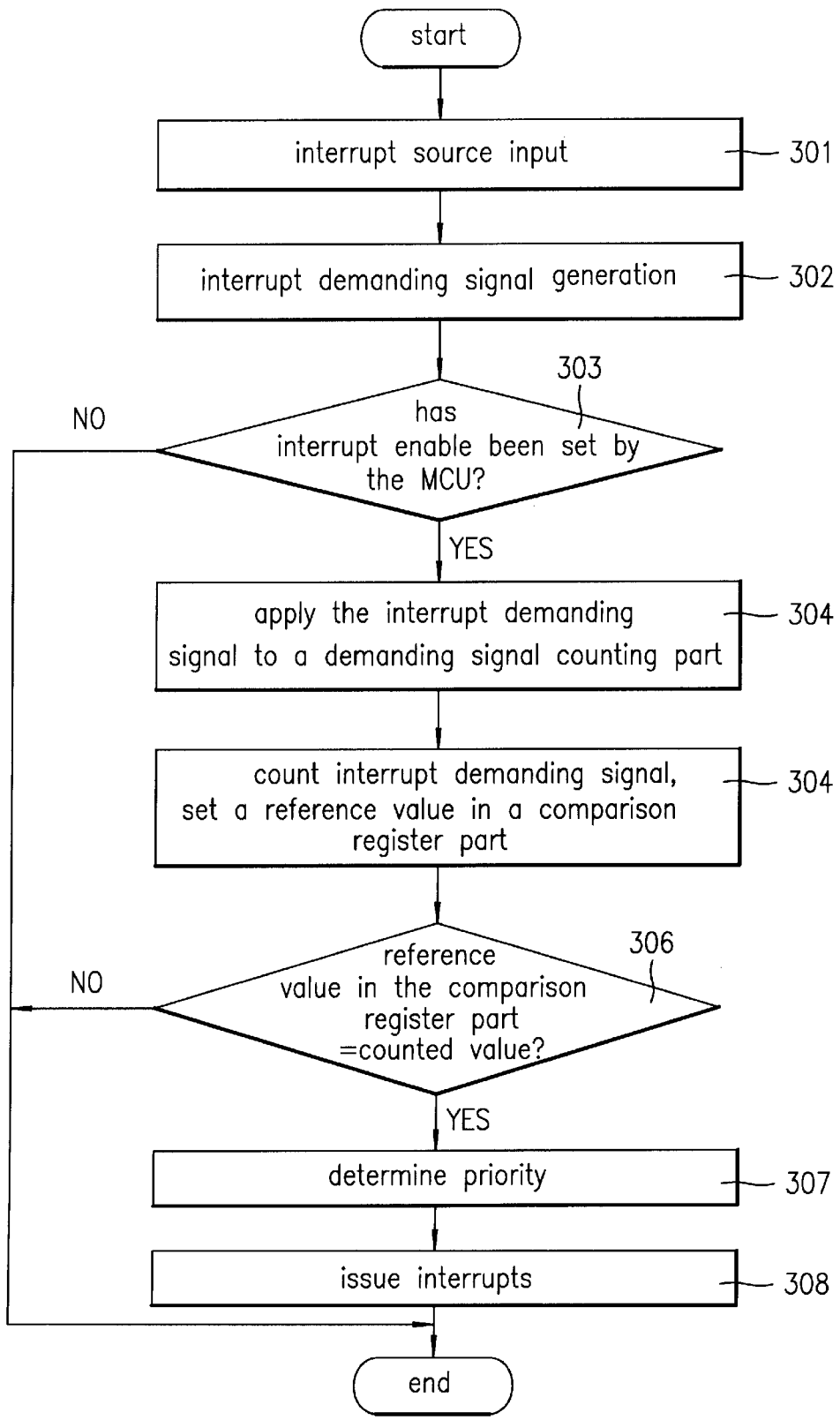

A method for generating an interrupt in accordance with a preferred embodiment of the present invention will be explained with reference to FIG. 3.

Upon reception of signals from a plurality of interrupt sources (step 301), a plurality of interrupt demanding signal generating parts apply interrupt demanding signals to an MCU (step 302). The MCU determines whether interrupt enabling parts 21 corresponding to the received interrupt demanding signals are enabled, i.e., set (step 303): if not set, the interrupt demanding signals are not transferred to the counting part 23, and, if set, those signals are transferred to the demanding signal counting part 23 (step 304). Then, the demanding signal counting part 22 counts the received interrupt demanding signal. Also, a reference value is set in a comparison register part 24 (step 305). Alternatively, the reference value could be set earlier.

The comparison register part 24 determines if the reference value and the counted value (counted by the demanding signal counting part 23) are identical (step 306). If the aforementioned values are not identical to each other, this is understood to mean that there is no interrupt generating signal, rather it was noise that was counted; thus, no interrupt is generated. If the aforementioned values are identical to each other, an authenticated interrupt demanding signal is issued to the priority determining part 25 (step 307). Accordingly, the priority determining part 25 ranks the authenticated signals according to their relative priorities and accordingly issues a plurality of interrupt signals (step 308).

As has been explained, the device and method for generating an interrupt of the present invention has the following advantages.

Since the device and method for generating an interrupt of the present invention can (by counting interrupt demanding signals and comparing the counted values against reference values set in the program of the MCU) prevent generation of unintended (or false) interrupts, e.g., which can be generated by noise, interrupt demands can be controlled effectively.

It will be apparent to those skilled in the art that various modifications and variations can be made in the device and method for generating an interrupt of the present invention without departing from the spirit or scope of the invention. Thus, it is intended that the present invention cover the modifications and variations of this invention that would be obvious to one of ordinary skill in the art based upon this disclosure, and that those modifications and variations be included within the scope of the appended claims and their equivalents.

What is claimed is:

1. A device in a microcomputer for discriminating between noise and real signals from interrupt sources so as to generate non-false interrupt signals, the device comprising:

a plurality of signal generators for supplying indiscriminate interrupt demanding signals in response to signals from a plurality of interrupt sources, respectively;

a plurality of counters for counting said indiscriminate interrupt demanding signals from the signal generators, respectively, to produce count values;

a plurality of comparators for comparing reference values against said count values to produce authenticated interrupt demanding signals, respectively; and a priority determining unit for receiving said authenticated interrupt demanding signals, for determining priorities thereof, and for issuing interrupt signals according to said priorities.

2. The device as claimed in claim 1, further including a register for each comparator, said register of each comparator being for storing said reference values used by said comparators, respectively.

3. The device as claimed in claim 1, further comprising:

a plurality of interrupt enabling units for enabling/disabling transfer of said indiscriminate interrupt request signals to said counters, said interrupt enabling units being controlled by said microcomputer.

4. The device as claimed in claim 1, wherein said priority determining unit includes a register having a bit allocated to each interrupt source such that said authenticated interrupt demanding signals from said comparators set said bits, respectively.

5. The device as claimed in claim 1, wherein said comparators are operable to produce said authenticated interrupt demanding signals when said counts equal said reference values, respectively.

6. A device as claimed in claim 1, further comprising a reference value setting unit.

7. A device as claimed in claim 1, further comprising a reference value resetting unit.

8. In a microcomputer to which interrupt sources are connected, a method for discriminating between noise and real signals from said interrupt sources so as to generate non-false interrupts, the method comprising the steps of:

generating interrupt demanding signals in response to signals from said interrupt sources; counting said indiscriminate interrupting demanding signals for each interrupt source, respectively, to produce count values;

comparing reference values against said count values, respectively, to discriminate between noise and real interrupt demanding signals and so to produce authenticated interrupt demanding signals;

determining priorities of said authenticated interrupt demanding signals; and issuing interrupt signals according to said priorities.

9. The method as claimed in claim 8, wherein said step of comparing includes producing said authenticated interrupt demanding signals when said counts equal said reference values, respectively.

10. The method of claim 8, further comprising setting said reference values.

11. The method of claim 8, further comprising resetting said reference values.

12. The method of claim 11, wherein said resetting of said reference values is performed at regular intervals.

* * * * *